US012811381B2

(12) United States Patent
Mencel et al.

(10) Patent No.: US 12,811,381 B2
(45) Date of Patent: Nov. 24, 2026

(54) WIRE-TYPE POWERED ELECTRICAL BOX COVER WITH SNAP-ON FACE PLATE

(71) Applicant: American Tack & Hardware Co., Inc., Brookfield, WI (US)

(72) Inventors: David Mencel, Menomonee Falls, WI (US); Celia Carroll, Milwaukee, WI (US); Yaohua Chen, Ningbo (CN)

(73) Assignee: American Tack & Hardware Co., Inc., Brookfield, WI (US)

( * ) Notice: Subject to any disclaimer, the term of this patent is extended or adjusted under 35 U.S.C. 154(b) by 0 days.

(21) Appl. No.: 19/332,405

(22) Filed: Sep. 18, 2025

(65) Prior Publication Data

US 2026/0088597 A1 Mar. 26, 2026

Related U.S. Application Data

(60) Provisional application No. 63/697,732, filed on Sep. 23, 2024.

(51) Int. Cl.

| | |
|---|---|
| ***H02G 3/14*** | (2006.01) |
| ***F21V 21/088*** | (2006.01) |
| ***F21V 33/00*** | (2006.01) |
| ***H02G 3/08*** | (2006.01) |

(52) U.S. Cl.

CPC ............. *H02G 3/14* (2013.01); *F21V 21/088* (2013.01); *F21V 33/006* (2013.01); *H02G 3/081* (2013.01)

(58) Field of Classification Search

CPC ........ H02G 3/14; F21V 21/088; F21V 33/006
See application file for complete search history.

(56) References Cited

U.S. PATENT DOCUMENTS 5,456,373 A 10/1995 Ford
5,670,776 A * 9/1997 Rothbaum .............. F21S 8/035 250/214 AL
6,278,062 B1 * 8/2001 Sowdon ................... H02G 3/14 174/67
6,281,440 B1 * 8/2001 Baldwin .................. H02G 3/14 174/67
6,974,910 B2 12/2005 Rohmer
9,728,947 B2 * 8/2017 Trojanowski .......... H02G 3/081
2003/0019732 A1 * 1/2003 Hunt .................... H01R 9/2475 200/309

(Continued)

*Primary Examiner* — Bryon T Gyllstrom
(74) *Attorney, Agent, or Firm* — Wong Meyer Smith & McConnell

(57) ABSTRACT

A powered switch or outlet cover includes a powered base plate and removable face plate. The face plate includes hooks that engage with hook receivers on the face plate. A latching arrangement separate from the hooks and hook receivers includes latching members on the base plate and corresponding engagement members on the face plate. Each engagement member deflects one of the latching members as the face plate is engaged with the base plate, to maintain engagement of the face plate with the base plate. A separation arrangement, in the form of a ramped surface on the powered base plate and an engagement surface on the face plate, enables a user to separate the face plate from the powered base plate by advancing a tool along the ramped surface, so when the tool contacts the engagement surface of the face plate, the face plate is separated from the powered base plate.

17 Claims, 9 Drawing Sheets

(56) References Cited

U.S. PATENT DOCUMENTS

| | | | | |
|---|---|---|---|---|
| 2003/0042038 | A1* | 3/2003 | Masson | H02G 3/14<br>174/66 |
| 2006/0086525 | A1* | 4/2006 | Xu | H02G 3/14<br>174/66 |
| 2008/0198628 | A1* | 8/2008 | Wu | H02G 3/14<br>362/642 |
| 2009/0126968 | A1* | 5/2009 | Glas | H02G 3/14<br>174/66 |
| 2009/0159307 | A1* | 6/2009 | Gober | H02G 3/20<br>174/66 |
| 2014/0182876 | A1* | 7/2014 | Trojanowski | H02G 3/14<br>174/66 |
| 2023/0216284 | A1* | 7/2023 | Lan | H02G 3/14<br>362/618 |
| 2025/0219371 | A1* | 7/2025 | Cox | H02G 3/081 |

* cited by examiner

WIRE-TYPE POWERED ELECTRICAL BOX COVER WITH SNAP-ON FACE PLATE

CROSS REFERENCE TO RELATED APPLICATION

This application claims the benefit of U.S. provisional patent application Ser. No. 63/697,732 filed Sep. 23, 2024, the entire contents of which are hereby incorporated by reference.

BACKGROUND AND SUMMARY

This invention relates to a powered wall plate adapted to be secured to an electrical switch or outlet, which is typically mounted within an electrical box.

In a manner is known, a conventional switch-type wall plate is configured to expose one or more switch components while preventing access to the interior of the electrical box. An outlet-type wall plate is configured to expose one or more outlets, while preventing access to the interior of the electrical box.

A conventional electrical switch or outlet cover is typically in the form of a plate that overlies a cavity of an electrical box, having an opening that accommodates a switch or outlet. The plate forming the switch or outlet cover is typically a molded member, which means that different colors, surface finishes and/or textures are only possible by molding individual plates, each having the desired color, finish, and/or texture. When it is desired to provide a different color, finish or texture for an existing switch or outlet cover, it is necessary to purchase a switch or outlet cover having the desired characteristics, remove the existing switch or outlet cover, and install the newly purchased switch or outlet cover with the desired characteristics. Powered wall plates, such as those that incorporate and LED lighting arrangement, are similarly constructed.

The present invention seeks to provide a powered electrical switch or outlet cover arrangement, such as a switch or outlet cover having an LED lighting arrangement, in which the color, finish and/or texture of the switch or outlet cover can be easily and quickly changed, and in which wide variety of appearance options are available beyond that which can be achieved in a molding process.

In accordance with an embodiment of the present invention, a powered cover arrangement for an electrical box defining an interior includes a powered base arrangement configured to be secured to the electrical box so as to enclose the interior of the electrical box, and a face member removably engageable with the base arrangement. The powered base arrangement may be in the form of a base plate configured to overlie the electrical box, with the base plate having a lighting arrangement and power supply components for supplying power to the lighting arrangement from a power source withing the electrical box. The lighting arrangement may be arranged at a lower end defined by the base plate.

The face member may be in the form of a face plate that is removably engageable with the base plate. The face plate may include one or more hook members, and the base plate may include one or more hook receivers within which the one or more hook members of the face plate are received. The face plate and the base plate may include a releasable latching arrangement separate from the hook members and hook receivers. The releasable latching arrangement may be in the form of one or more deflectable latching members on the base plate and one or more corresponding engagement members on the face plate. Each engagement member functions to deflect each latching member as the face plate is engaged with the base plate, and subsequent engagement between the latching members and the engagement members maintains the face plate in engagement with the base plate. The face plate includes a recess that is configured to expose the lighting arrangement of the base plate when the face plate is engaged with the base plate.

The one or more hook members may be provided on an upper end defined by the face plate, and the one or more hook receivers may be provided on an upper end defined by the base plate. The one or more deflectable latching members may each be provided on a side surface defined by the base plate, and the one or more engagement members may each be provided on a corresponding side surface of the face plate.

A separation arrangement separate from the latching arrangement, the hook members and the hook receivers may be provided for enabling a user to manually remove the face plate from the base plate. The separation arrangement may be in the form of a ramped surface provided on the base plate and an engagement surface provided on the face plate. A user may separate the face plate from the base plate by advancing a tool along the ramped surface, such that the tool comes into contact with the engagement surface of the face plate and thereby causes separation of the face plate from the base plate. Separation of the face plate from the base plate causes each engagement member to contact its corresponding latching member and to deflect each latching member as the face plate is disengaged from the base plate. The ramped surfaces of the separation arrangement by be in the form of a pair of ramped surfaces located one on either side of the lighting arrangement.

An embodiment of the present invention further contemplates a method of mounting a cover arrangement to an electrical box defining an interior, substantially in accordance with the foregoing summary.

Other aspects, features and advantages of the invention will become apparent to those skilled in the art from the following detailed description and accompanying drawings. It should be understood, however, that the detailed description and specific examples, while indicating certain embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

A clear conception of the advantages and features constituting the present invention, and the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements can be several views, and in which.

Figure 1:
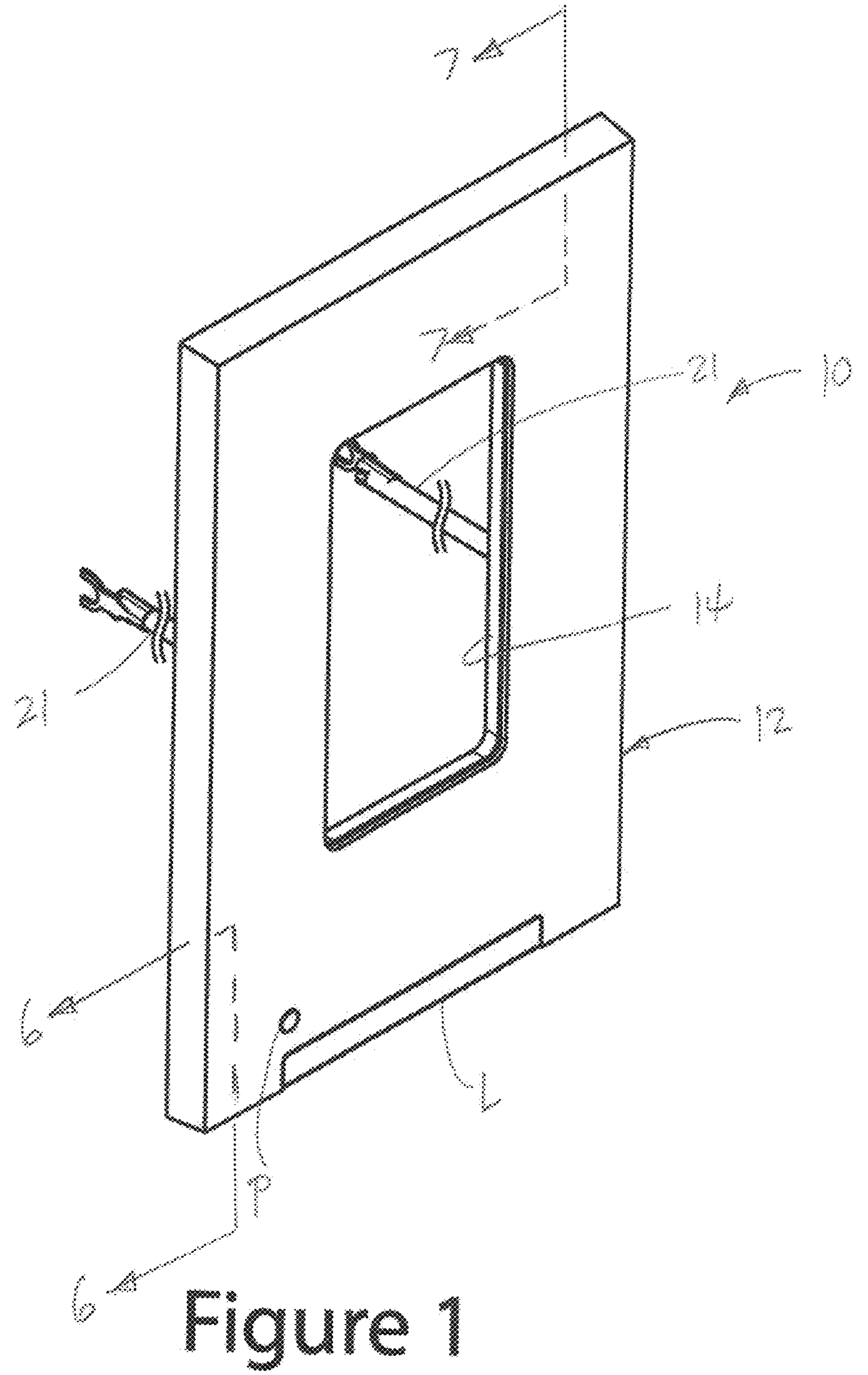
FIG. 1 is a front isometric view of a powered electrical box cover, such as a powered switch cover, in accordance with an embodiment of the present invention.

In describing the representative embodiment of the invention that is illustrated in the drawings, specific terminology will be resorted to for the sake of clarity. However, it is not intended that the invention be limited to the specific terms so selected, and it is to be understood that each specific term includes all technical equivalents, which operate in a similar manner to accomplish a similar purpose. For example, the words "connected," "attached," or terms similar thereto are often used. They are not limited to direct connection but include connection through other elements where such connection would be recognized as being equivalent by those skilled in the art.

DETAILED DESCRIPTION

An embodiment of the present invention and the various features and advantageous details thereof are explained more fully with reference to the non-limiting embodiments described in detail in the following description.

FIG. 1 illustrates a powered switch-type wall plate assembly 10 in accordance with an embodiment of the present invention. The powered wall plate assembly 10 has a cover or face plate 12 defining an opening 14. In a manner as is known, the opening 14 is configured to expose an electrical switch. Similarly constructed powered wall plate assemblies may include any number of openings with various configurations to cover an electrical box while exposing components to be accessed such as, for example, any number of electrical outlets or any number of differently configured switches.

Figure 2:
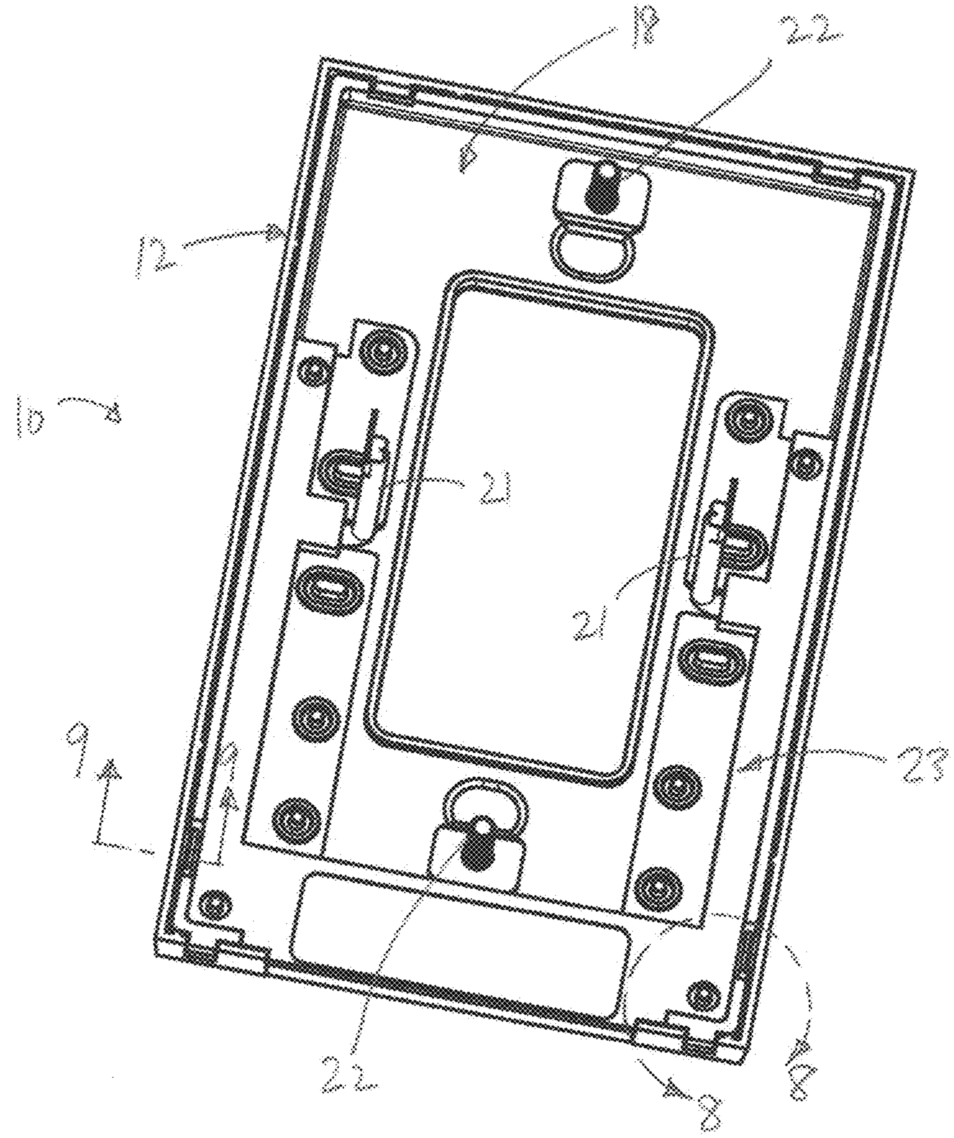
FIG. 2 is a rear isometric view of the electrical box cover of FIG. 1.
Figure 3:
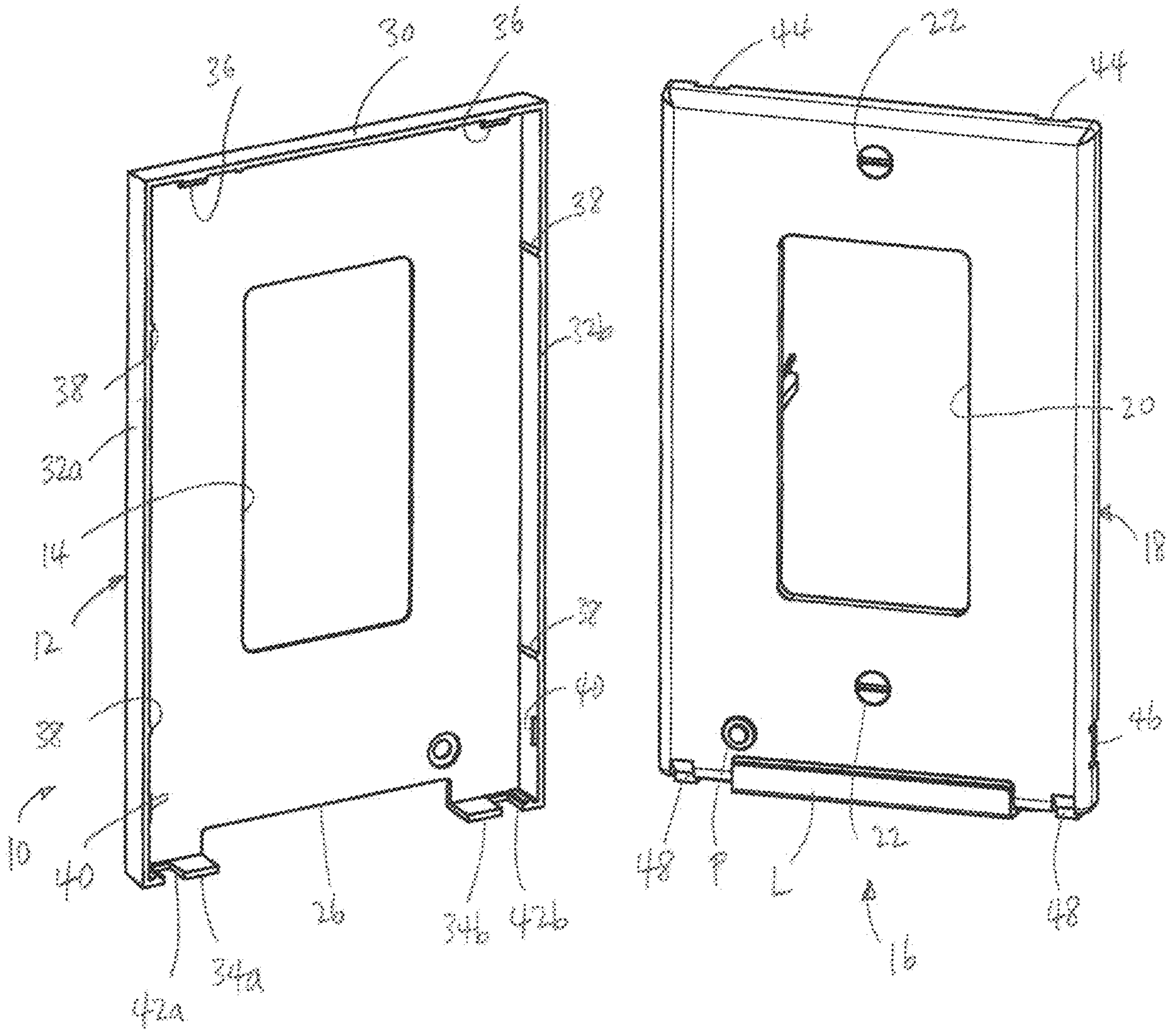
FIG. 3 is an exploded isometric view of the components of the powered electrical box cover of FIGS. 1 and 2.
Figure 4:
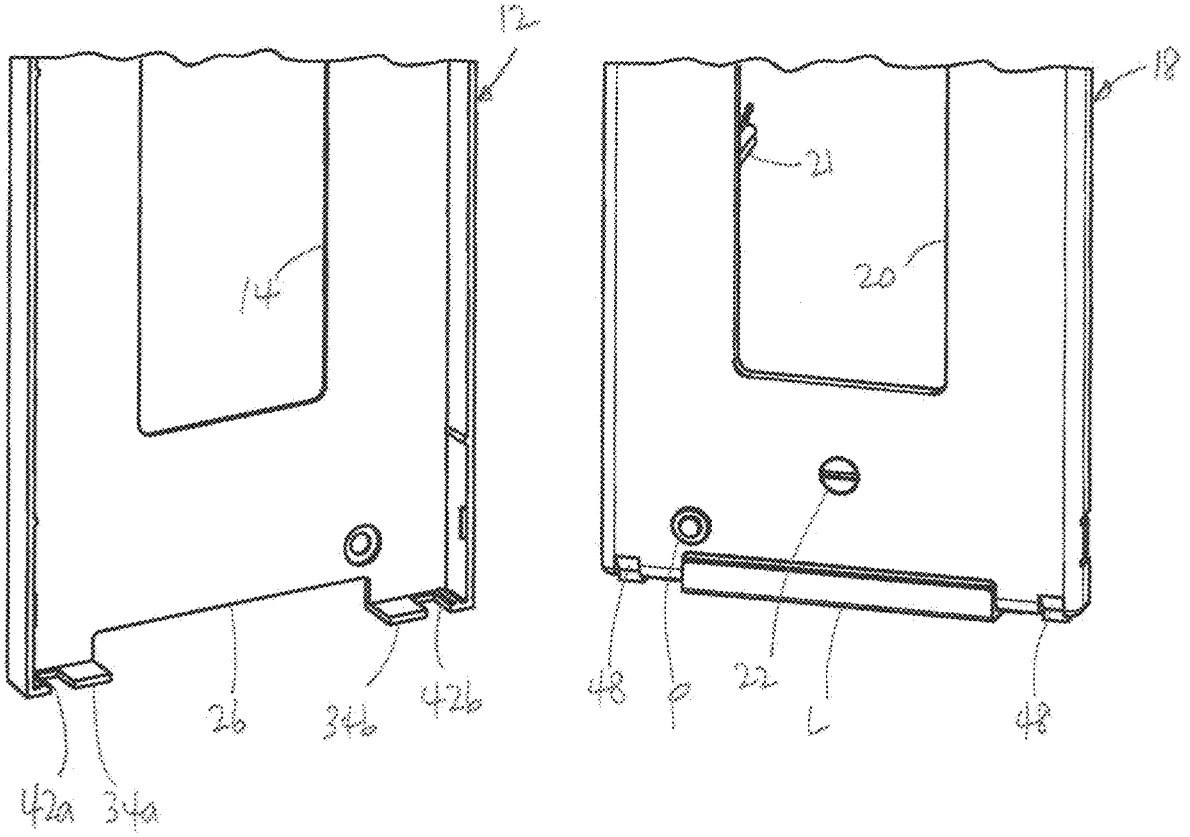
FIG. 4 is a partial exploded isometric view showing the lower portions of the components of the powered electrical box cover of FIGS. 1-3.
Figure 5:
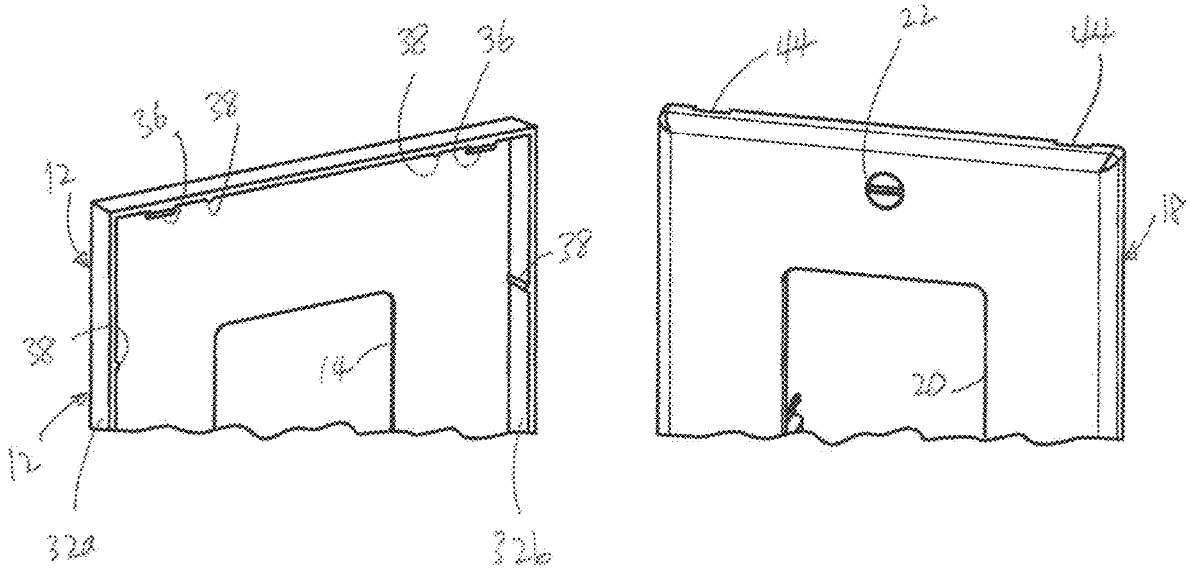
FIG. 5 is a partial exploded isometric view showing the upper portions of the components of the powered electrical box cover of FIGS. 1-4.

As shown in FIGS. 1-3, the powered wall plate assembly 10 includes a powered base assembly 16 that is configured to be covered by the face plate 12. The powered base assembly 16 includes a base plate 18 having an opening 20 that is configured to align with face place opening 14. In a manner as is known, the powered base assembly 16 is adapted to be secured to an electrical box via a pair of fasteners such as screws 22, although it is understood that any other securement arrangement may be employed.

In the embodiment of powered wall plate assembly 10 as shown in FIGS. 1-3, the powered base assembly 16 includes electrification components, through which electrical power is provided to the base assembly 16. In the illustrated embodiment, the electrification components may be in the form of electrical wires 21, which are provided with connectors at their ends that are configured to be engaged by screws on the underlying electrical componentry contained within the electrical box that the wall plate assembly 10 overlies. The power that is provided to the base assembly 16 in this manner may be supplied to a lighting arrangement L, which representatively may be an LED assembly or the like that selectively illuminates the area in the vicinity of the wall plate assembly 10. A generally U-shaped rear cover 23 is mounted to the rear surface of base plate 18. The lighting arrangement L may be carried by the U-shaped cover 23, which is configured to overlie the wires 21 such that the wires 21 are sandwiched between the rear surface of the base plate 18 and the U-shaped cover 23. In one embodiment, the base assembly 16 may be provided with a photo eye P that is exposed through an opening 24 in face plate 12, so that the lighting arrangement L is activated when the ambient light level in the vicinity of the wall plate assembly 10 falls below a predetermined level. In the illustrated embodiment, the face plate 16 includes a recess or notch 26, within which lighting arrangement L is received when the face plate and base assembly 16 are secured together.

An embodiment of the present invention contemplates the illustrated multi-component construction of the wall plate assembly 10, which enables the face plate 12 to be selectively engaged with and disengaged from the underlying powered base assembly 16. With this multi-part construction, the face plate 12 can be selected and changed out quickly and easily without the need for removing or otherwise disturbing the base assembly 16. This feature enables a manufacturer to offer face plates such as 12 in a wide variety of styles, appearances, colors and finishes, while requiring manufacture, assembly and installation of only a single base assembly 16.

Referring to FIGS. 1-5, the face plate 12 includes a top wall 30, a pair of sidewalls 32*a*, 32*b*, and a pair of bottom wall sections 34*a*, 34*b*, between which notch 26 is located. The top wall 30 includes a pair of downwardly extending inner hook members 36, and the sidewalls 32*a*, 32*b* are formed with inwardly extending protrusions or ribs 38. In the illustrated embodiment, each sidewall 32*a*, 32*b* is provided with a pair of ribs 38 along its height. It is understood, however, that the sidewalls 32*a*, 32*b* may be provided with any number of ribs 38. In addition, the top wall 30 includes a pair of inwardly extending spaced apart ribs 38, and a rib 38 is provided on each bottom wall section 34*a*, 34*b*. Sidewalls 32*a*, 32*b* are also provided with inwardly extending engagement members or tabs 40 toward their lower ends. Notches 42*a*, 42*b* are formed in the respective bottom wall sections 34*a*, 34*b*.

The base plate 18 defines a top surface within which a pair of hook-receiving notches 44 are formed, and the side surfaces of base plate 18 are each formed with a resilient latching member or finger 46. The bottom surface of base plate 18 defines a pair of ramped surfaces 48, each of which is located adjacent one of the side surfaces of base plate 18.

Figure 7:
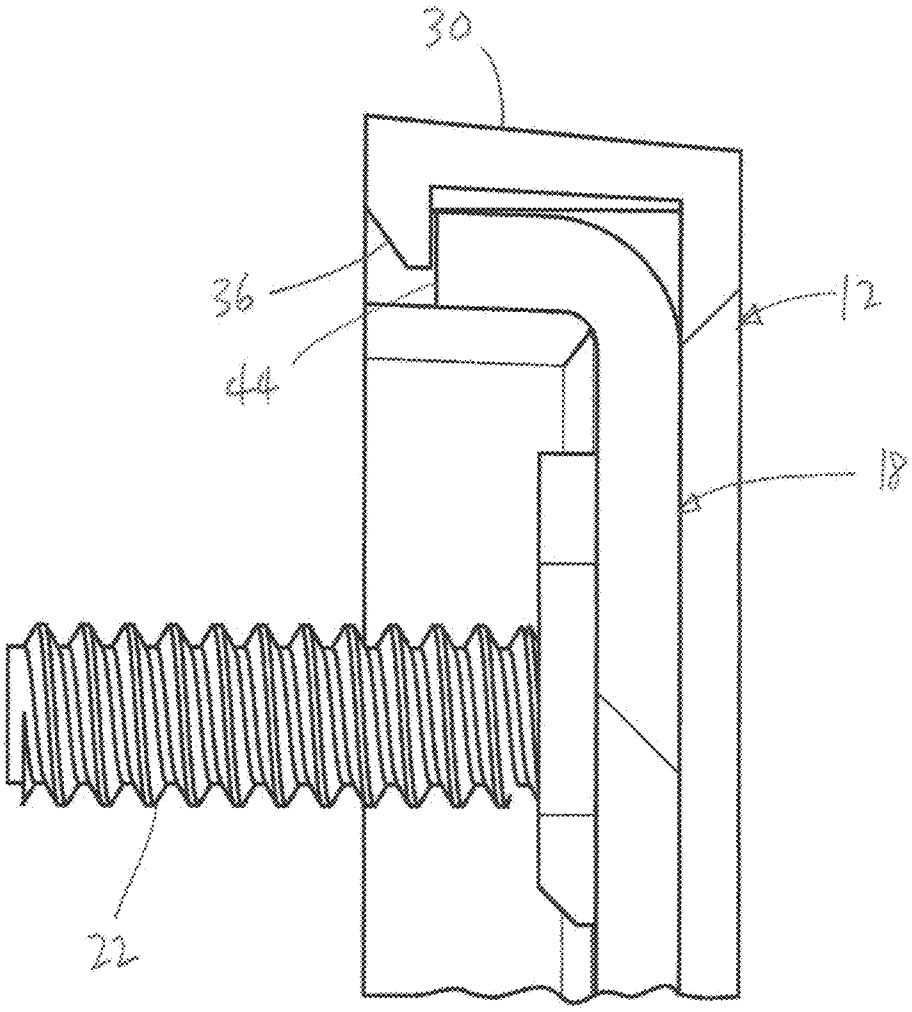
FIG. 7 is a partial section view taken along line 7-7 of FIG. 1.
Figure 8:
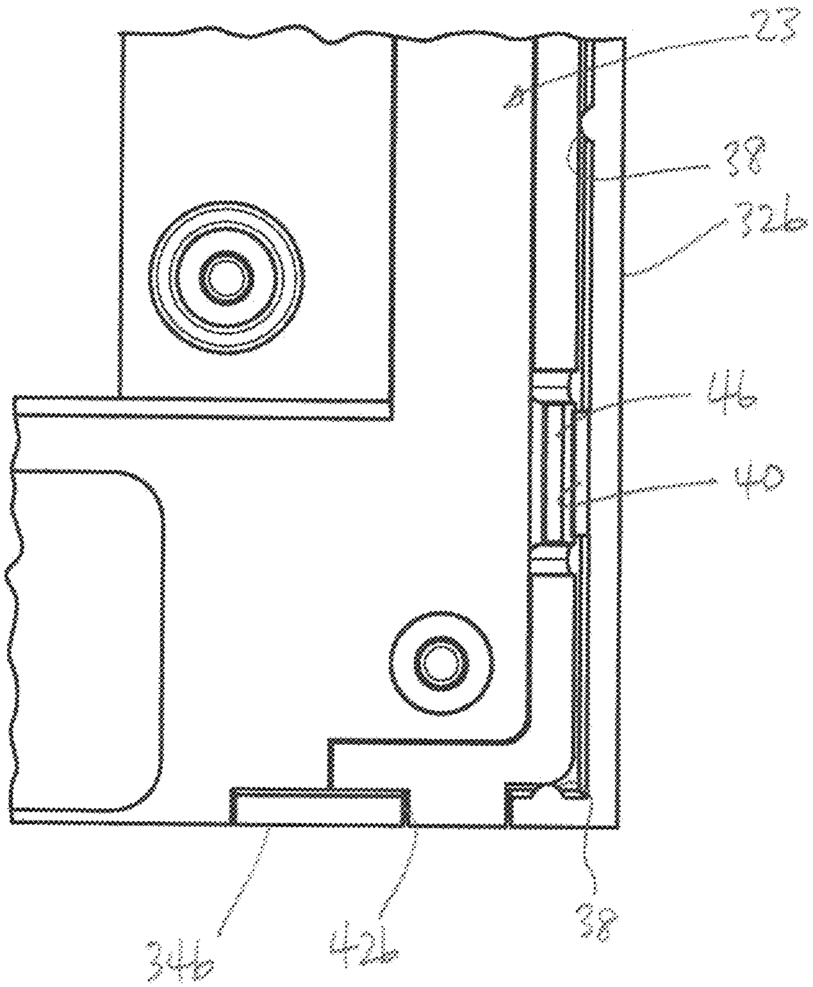
FIG. 8 is an enlarged partial elevation view of the area shown at 8-8 of FIG. 2.
Figure 9:
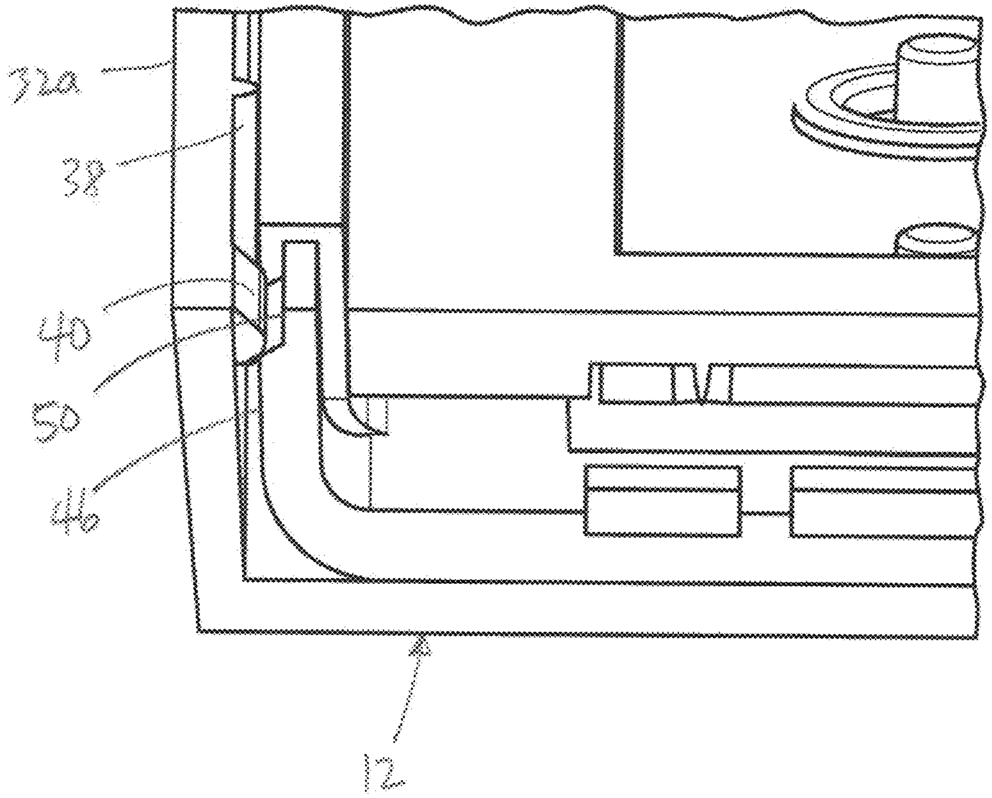
FIG. 9 is a partial section view taken along line 9-9 of FIG. 2.

In operation, face plate 12 is mounted to base plate 18 of base assembly 16 subsequent to installation of base assembly 16 onto an electrical box or the like. To accomplish this, the user first positions face plate 12 over base plate 18 such that the top wall 30 of face plate 12 is located vertically above the top surface of the base plate 18. In this position, the face plate 12 is oriented at an angle relative to the base plate 18 due to engagement of the bottom wall sections 34*a*, 34*b* of face plate 12 with the front surface of the base plate 18. The user then moves face plate 12 downwardly so as to position hook members 36 of face plate 12 within hook-receiving notches 44 on the top surface of base plate 18, as shown in the section view of FIG. 7. With hook members 36 positioned in this manner, the lower area of face plate 12 can be pivoted toward base plate 18, which results in bottom wall sections 34*a*, 34*b* of face plate 12 being positioned below and against the bottom surface of base plate 18 on either side of lighting arrangement L. Accordingly, the notches 42*a*, 42*b* and corresponding ramped surfaces 48 are located one on either side of the lighting arrangement L. As face plate 12 is engaged over base plate 18 in this manner, the ribs 38 that extend inwardly from face plate top wall 30, side walls 32_a_, 32_b_ and bottom wall sections 34_a_, 34_b_ come into contact with the facing top, side and bottom surfaces, respectively, of base plate 18, so as to provide a secure engagement between the face plate 12 and base plate 18. During such movement of face plate 12 onto base plate 18, the inwardly extending tabs 40 on face plate sidewalls 32_a_, 32_b_ engage and move along the resilient fingers 46 of base plate 18. The resilient fingers 46 deflect during such inward movement tabs 40, until each tab 40 is moved past a shoulder 50 located at the inner end of each finger 46, as shown in FIG. 9. Each resilient finger 46 then returns to its undeflected position. With this arrangement, the tabs 40 and fingers 46 together form a latching arrangement which, in combination with the hook members 36 and hook receiving notches 44, releasably secure the face plate 12 and base plate 18 together. When face plate 12 is engaged with base plate 18 in this manner, the lighting arrangement L is exposed such that light emitted by the lighting arrangement L shines outwardly and downwardly when lighting arrangement L is illuminated. It can be appreciated, however, that the configuration of lighting arrangement L with respect to face plate 16 and base plate 18 may be such as to direct the light from lighting arrangement L in any direction as desired.

Figure 6:
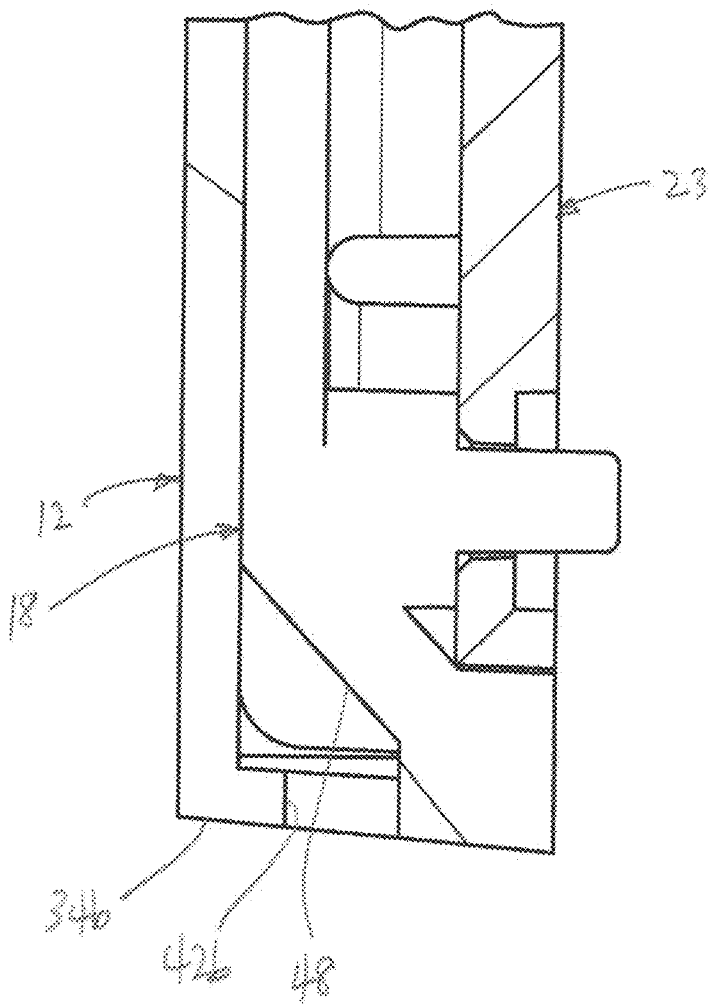
FIG. 6 is a partial section view taken along lines 6-6 of FIG. 1.

With reference to FIG. 6, in the event a user wishes to subsequently remove the face plate 12, such as for replacement or to service the electrical box, the user inserts a tool such as the end of a screwdriver upwardly into and through one of the notches 42_a_, 42_b_ in the bottom wall sections 34_a_, 34_b_, respectively. The end of the tool, such as the tip of the screwdriver, is moved upwardly into engagement with the ramped surface 48 defined by the bottom surface of the base plate 18. Continued upward movement of the tool along the ramped surface 48 brings the tool into engagement with an engagement surface in the form of the end of the notch 42_a_, 42_b_ within which it is received, which causes the face plate 12 to pivot outwardly. During such movement, each tab 40 comes into engagement with the shoulder of its respective finger 46, causing the finger 46 to deflect inwardly to allow the tab 40 to move outwardly.

Although the best mode contemplated by the inventor of carrying out the illustrated embodiment of the present invention is disclosed above, practice of the illustrated embodiment of the present invention is not limited thereto. It will be manifest that various additions, modifications and rearrangements of the aspects and features of the present invention may be made in addition to those described above without deviating from the spirit and scope of the underlying inventive concept. The scope of some of these changes is discussed above. The scope of other changes to the described embodiments that fall within the present invention but that are not specifically discussed above will become apparent from the appended claims and other attachments. It is also understood that the embodiment of the invention disclosed and defined herein extends to all alternative combinations of two or more of the individual features mentioned or evident from the text and/or drawings. All of these different combinations constitute various alternative aspects of the present invention.

We claim:

1. A powered cover arrangement for an electrical box defining an interior, comprising a powered base arrangement configured to be secured to the electrical box so as to enclose the interior of the electrical box, wherein the powered base arrangement includes a lighting arrangement configured to be electrically connected to a power supply contained within the interior of the electrical box, and a face member removably engageable with the powered base arrangement, wherein the face member is configured to expose the lighting arrangement when the face member is engaged with the powered base arrangement;

wherein the powered base arrangement comprises a base plate configured to overlie the electrical box, and wherein the face member comprises a face plate that is removably engageable with the base plate;

wherein the face plate includes one or more hook members and the base plate includes one or more hook receivers within which the one or more hook members of the face plate are received, and further comprising a releasable latching arrangement interposed between the face plate and the base plate that is separate from the hook members and hook receivers.

2. The powered cover arrangement of claim 1, wherein the releasable latching arrangement comprises one or more deflectable latching members on the base plate and one or more corresponding engagement members on the face plate, wherein each engagement member functions to deflect each latching member as the face plate is engaged with the base plate, and wherein subsequent engagement between the latching members and the engagement members maintains the face plate in engagement with the base plate.

3. The powered cover arrangement of claim 2, wherein the one or more hook members are provided on an upper end defined by the face plate and the one or more hook receivers are provided on an upper end defined by the base plate.

4. The powered cover arrangement of claim 3, wherein the one or more deflectable latching members are each provided on a side surface defined by the base plate, and wherein the one or more engagement members are each provided on a corresponding side surface of the face plate.

5. The powered cover arrangement of claim 2, further comprising a separation arrangement separate from the latching arrangement, the hook members and the hook receivers for enabling a user to manually remove the face plate from the base plate.

6. The powered cover arrangement of claim 5, wherein the separation arrangement comprises a ramped surface provided on the base plate and an engagement surface provided on the face plate, wherein advancement of a tool along the ramped surface causes the tool to come into contact with the engagement surface of the face plate and thereby cause separation of the face plate from the base plate.

7. The powered cover arrangement of claim 6, wherein the lighting arrangement is located toward a lower end defied by the base plate, and wherein the ramped surfaces on the base plate and the engagement surfaces on the face plate are located one on either side of the lighting arrangement.

8. A method of mounting a powered cover arrangement to an electrical box defining an interior, comprising the acts of securing a powered base arrangement to the electrical box so as to overlie the interior of the electrical box, wherein the powered base arrangement includes a lighting arrangement configured to be electrically connected to a power supply contained within the interior of the electrical box, and removably engaging a face member with the powered base arrangement, wherein the face member is configured to expose the lighting arrangement when the face member is engaged with the powered base arrangement;

wherein the powered base arrangement comprises a base plate configured to overlie the electrical box, and wherein the face member comprises a face plate that is removably engageable with the base plate, and including the act of engaging one or more hook members on the faceplate with one or more hook receivers on the base plate in a first location, and engaging a releasable latching arrangement associated with the base plate and the face plate in a second location spaced from the first location.

9. The method of claim 8, wherein the releasable latching arrangement comprises one or more deflectable latching members on the base plate and one or more corresponding engagement members on the face plate, wherein each engagement member functions to deflect each latching member as the face plate is engaged with the base plate, and wherein subsequent engagement between the latching members and the engagement members maintains the face plate in engagement with the base plate.

10. The method of claim 9, wherein the one or more hook members are provided on an upper end defined by the face plate and the one or more hook receivers are provided on an upper end defined by the base plate.

11. The method of claim 10, wherein the one or more deflectable latching members are each provided on a side surface defined by the base plate, and wherein the one or more engagement members are each provided on a corresponding side surface of the face plate.

12. The method of claim 9, further comprising the act of separating the face plate from the base plate using a separation arrangement separate from the latching arrangement, the hook members and the hook receivers.

13. The method of claim 12, wherein the separation arrangement comprises a ramped surface provided on the base plate and an engagement surface provided on the face plate, wherein the act of separating the face plate from the base plate is carried out by advancing a tool along the ramped surface and causing the tool to come into contact with the engagement surface of the face plate to thereby cause separation of the face plate from the base plate.

14. The method of claim 13, wherein the lighting arrangement is located toward a lower end defied by the base plate, and wherein the ramped surfaces on the base plate and the engagement surfaces on the face plate are located one on either side of the lighting arrangement when the face plate is engaged with the base plate.

15. A powered cover arrangement for an electrical box defining an interior, comprising:

a powered base assembly configured to be secured to the electrical box so as to enclose the interior of the electrical box, wherein the powered base assembly includes one or more hook receivers and a lighting arrangement configured to be electrically connected to a power supply contained within the interior of the electrical box, wherein the lighting arrangement is located toward a lower end defined by the powered base assembly;

a face plate removably engageable with the powered base assembly, wherein the face plate has one or more hooks members that are receivable within the one or more hook receivers of the base plate and wherein the face plate is configured to expose the lighting arrangement when the face member is engaged with the powered base assembly;

wherein the powered base assembly and the face plate include a releasable latching arrangement separate from the hook members and hook receivers that maintains the face plate in engagement with the powered base assembly; and wherein the powered base assembly and the face plate further include a separation arrangement separate from the latching arrangement, the hook members and the hook receivers for enabling a user to manually remove the face plate from the powered base assembly.

16. The powered cover arrangement of claim 15, wherein the one or more hook members are provided on an upper end defined by the face plate and the one or more hook receivers are provided on an upper end defined by the powered base assembly, and wherein the releasable latching arrangement comprises one or more deflectable latching members on a side surface of the powered base assembly and one or more corresponding engagement members on a side surface of the face plate, wherein each engagement member functions to deflect each latching member as the face plate is engaged with the powered base assembly, and wherein subsequent engagement between the latching members and the engagement members maintains the face plate in engagement with the powered base assembly.

17. The powered cover arrangement of claim 15, wherein the separation arrangement comprises a ramped surface provided on the powered base assembly and an engagement surface provided on the face plate, wherein advancement of a tool along the ramped surface causes the tool to come into contact with the engagement surface of the face plate and thereby cause separation of the face plate from the powered base, wherein the ramped surfaces on the base plate and the engagement surfaces on the face plate are located one on either side of the lighting arrangement.

* * * * *